(12) United States Patent
Sakamoto

(10) Patent No.: US 12,124,899 B2
(45) Date of Patent: Oct. 22, 2024

(54) MANAGEMENT SYSTEM, METHOD, MANAGEMENT SERVER, AND COMPUTER-READABLE STORAGE MEDIUM STORING PROGRAM

(71) Applicant: CANON KABUSHIKI KAISHA, Tokyo (JP)

(72) Inventor: Takahiro Sakamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/386,668

(22) Filed: Nov. 3, 2023

(65) Prior Publication Data

US 2024/0062029 A1   Feb. 22, 2024

Related U.S. Application Data

(63) Continuation of application No. 17/464,762, filed on Sep. 2, 2021, now Pat. No. 11,847,515.

(30) Foreign Application Priority Data

Sep. 11, 2020   (JP) .................................. 2020-153176

(51) Int. Cl.
*G06K 15/00*   (2006.01)
(52) U.S. Cl.
CPC ....... *G06K 15/4075* (2013.01); *G06K 15/007* (2013.01); *G06K 15/4095* (2013.01)
(58) Field of Classification Search
None
See application file for complete search history.

(56) References Cited

U.S. PATENT DOCUMENTS

| | | |
|---|---|---|
| 10,336,086 B2 | 7/2019 | Matsuda |
| 10,843,478 B2 | 11/2020 | Komine |
| 10,937,422 B2 | 3/2021 | Naruse |
| 10,939,165 B2 | 3/2021 | Sakamoto |

(Continued)

FOREIGN PATENT DOCUMENTS

| | | |
|---|---|---|
| JP | 2002-127568 A | 5/2002 |
| JP | 2005-136595 A | 5/2005 |

(Continued)

*Primary Examiner* — Dov Popovici
(74) *Attorney, Agent, or Firm* — VENABLE LLP

(57) ABSTRACT

A printing apparatus management server manages a plurality of printing apparatuses, obtains, in response to a request from a voice device management server, information of a predetermined printing apparatus registered, from the plurality of printing apparatuses, as a printing apparatus to be used in the printing apparatus management server, transmits, to the voice device management server, the obtained information of the predetermined printing apparatus, obtains remaining amount information transmitted from the predetermined printing apparatus, and transmits the obtained remaining amount information to the consumable item management server. Voice notification to a user is performed, via a voice device configured to communicate with the voice device management server, based on the obtained remaining amount information, and processing for placing an order for the consumable item is performed based on a voice instruction from the user accepted by the voice device.

23 Claims, 12 Drawing Sheets

(56) References Cited

U.S. PATENT DOCUMENTS

| | | | |
|---|---|---|---|
| 11,201,975 B2 | 12/2021 | Onishi | |
| 2021/0006673 A1* | 1/2021 | Sakamoto | .......... H04N 1/00403 |
| 2021/0197603 A1 | 7/2021 | Tanaka | |

FOREIGN PATENT DOCUMENTS

| | | | |
|---|---|---|---|
| JP | 2006-095984 A | 4/2006 |
| JP | 2010-146033 A | 7/2010 |
| JP | 2016-194771 A | 11/2016 |
| JP | 2019-095933 A | 6/2019 |
| JP | 2020-129203 A | 8/2020 |

* cited by examiner

FIG. 6

| ORDER ID | COLOR | PRODUCT CODE | THRESHOLD | MODEL NAME |
|---|---|---|---|---|
| 00000001 | BLACK | XXX1/XXX1-XL | 20% | AAAA |
| 00000002 | CYAN | XXX2/XXX2-XL | 10% | AAAA |
| 00000003 | MAGENTA | XXX3/XXX3-XL | 10% | AAAA |
| 00000004 | YELLOW | XXX4/XXX4-XL | 10% | AAAA |
| 00000005 | PIGMENT BLACK | YYY1 | 10% | BBBB |
| 00000006 | BLACK | YYY2 | 10% | BBBB |
| 00000007 | CYAN | YYY3 | 10% | BBBB |
| 00000008 | MAGENTA | YYY4 | 10% | BBBB |
| 00000009 | YELLOW | YYY5 | 10% | BBBB |
| 00000010 | GRAY | YYY6 | 10% | BBBB |

FIG. 7

| MODEL NAME (701) | INK DESTINATION (702) | ORDER ID LIST (703) |
|---|---|---|
| AAAA | JP | 00000001<br>00000002<br>00000003<br>00000004 |
| BBBB | US | 00000005<br>00000006<br>00000007<br>00000008<br>00000009<br>00000010 |

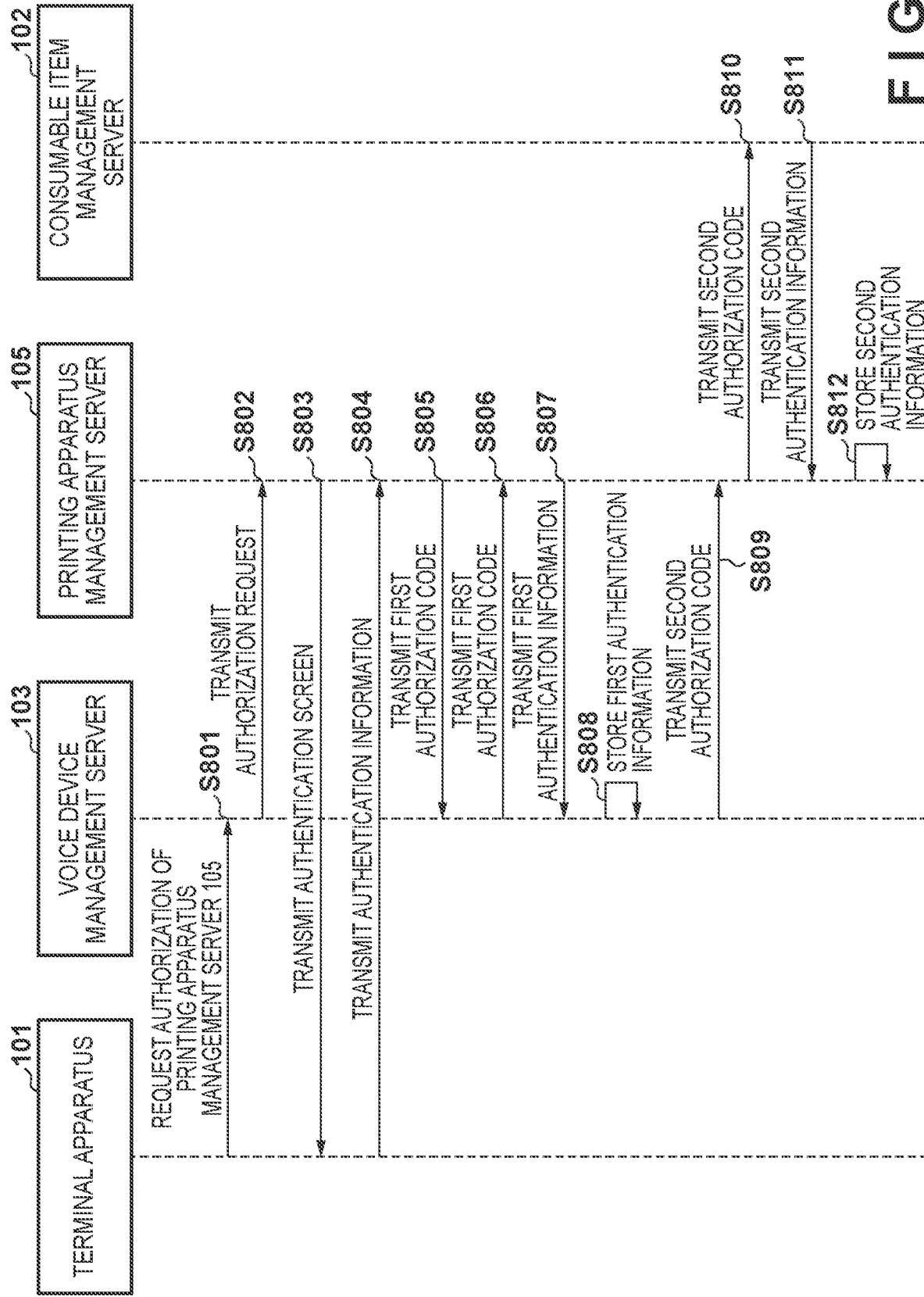

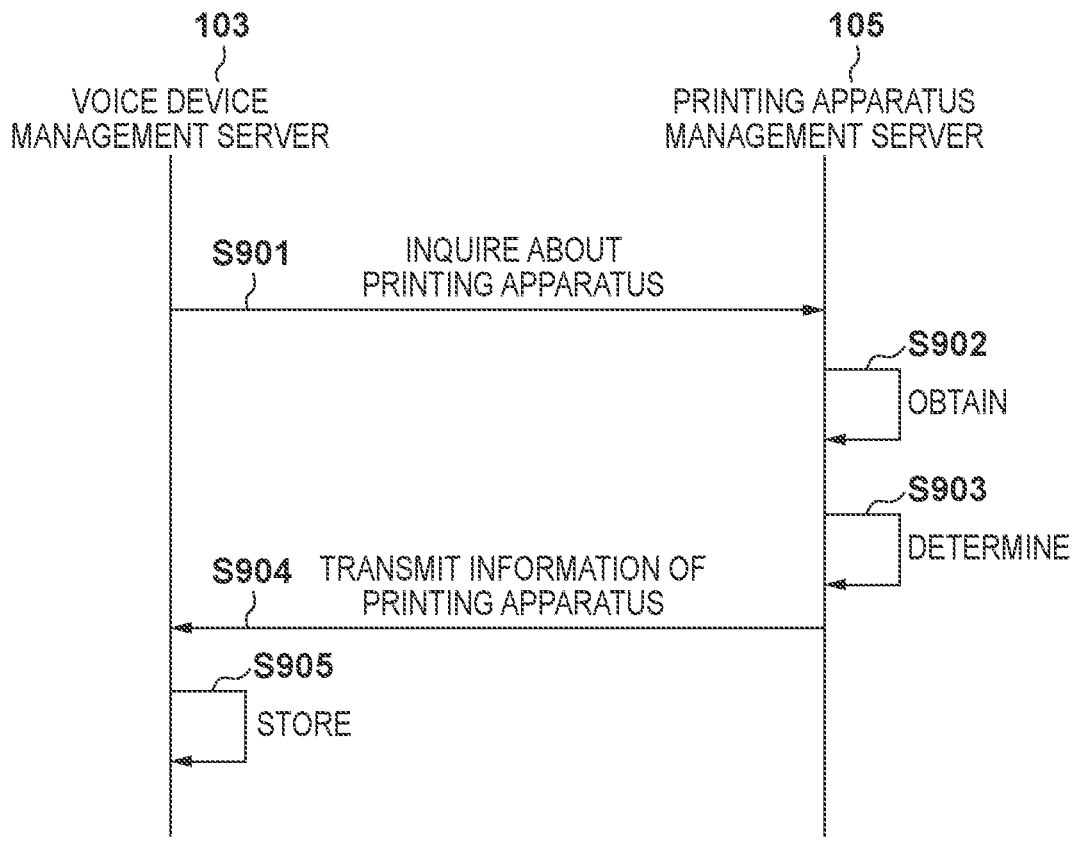
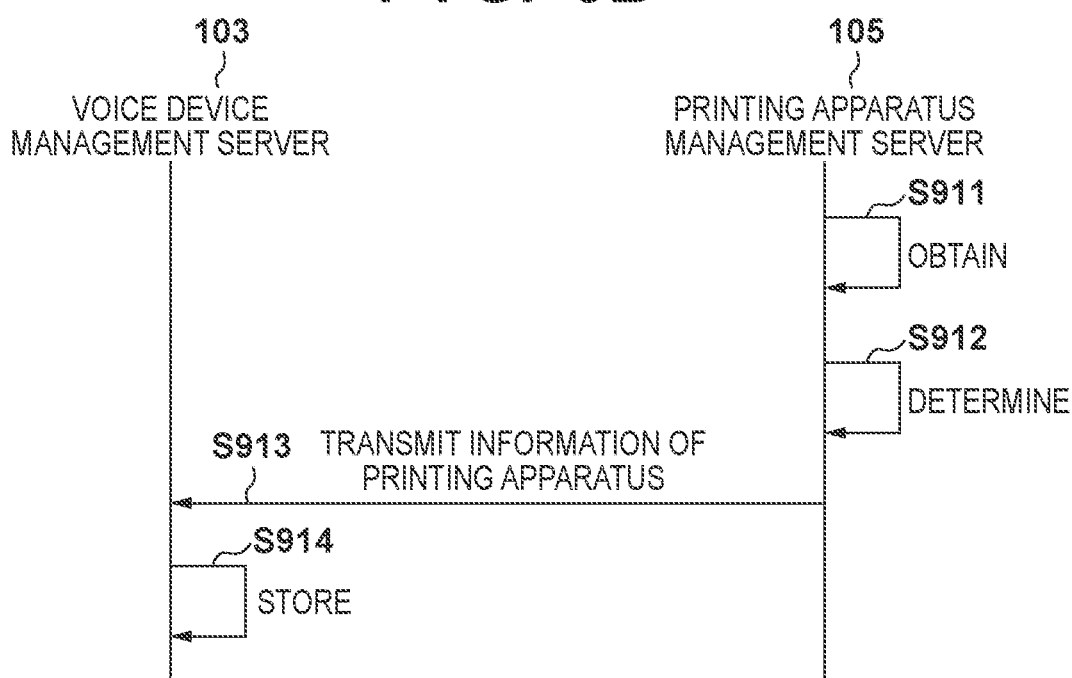

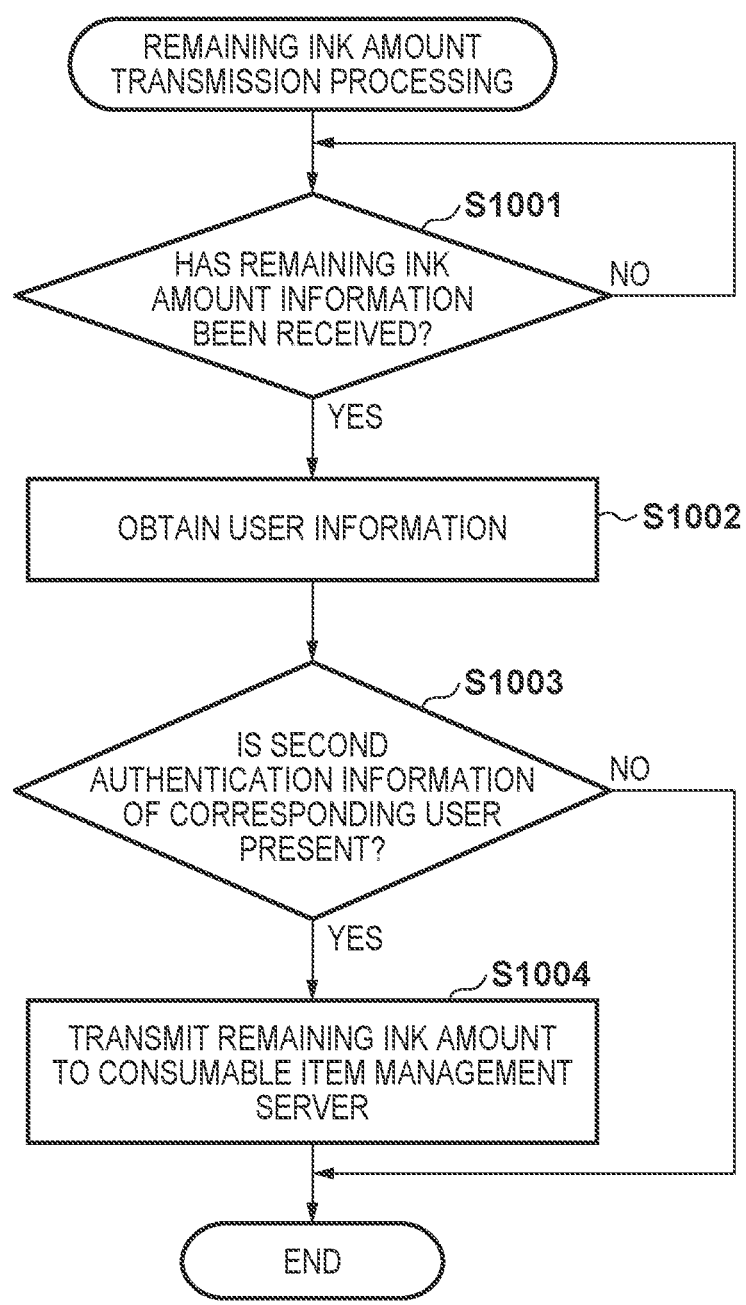

MANAGEMENT SYSTEM, METHOD, MANAGEMENT SERVER, AND COMPUTER-READABLE STORAGE MEDIUM STORING PROGRAM

This application is a continuation of application Ser. No. 17/464,762, filed Sep. 2, 2021.

BACKGROUND OF THE INVENTION

Field of the Invention

The present invention relates to a management system, a method, a management server, and a computer-readable storage medium storing a program.

Description of the Related Art

A voice control system in which a printing apparatus is controlled by voice is known. Japanese Patent Laid-Open No. 2006-95984 discloses a technique that allows print settings such as sheet size settings and the like, which are operated by a user in a printing process, to be instructed by voice.

SUMMARY OF THE INVENTION

The present invention provides a technique that allows an order for a consumable item, which is used in a printing apparatus registered in a system, to be placed by a voice instruction.

The present invention in one aspect provides a management system that includes a predetermined printing apparatus and a printing apparatus management server which can communicate with a voice device management server and a consumable item management server, wherein the predetermined printing apparatus is configured to transmit remaining amount information of a consumable item used in the predetermined printing apparatus, and the printing apparatus management server comprises a management unit configured to manage a plurality of printing apparatuses, a first obtainment unit configured to obtain, in response to a request from the voice device management server, information of the predetermined printing apparatus registered, from the plurality of printing apparatuses, as a printing apparatus to be used in the printing apparatus management server, a first transmission unit configured to transmit, to the voice device management server, the information of the predetermined printing apparatus obtained by the first obtainment unit, a second obtainment unit configured to obtain the remaining amount information transmitted from the predetermined printing apparatus, and a second transmission unit configured to transmit the remaining amount information obtained by the second obtainment unit to the consumable item management server, and voice notification to a user is performed, via a voice device configured to communicate with the voice device management server, based on the remaining amount information obtained by the second obtainment unit, and processing for placing an order for the consumable item is performed based on a voice instruction from the user accepted by the voice device.

According to the present invention, an order for a consumable item which is to be used in a printing apparatus registered in a system can be placed by a voice instruction.

Further features of the present invention will become apparent from the following description of exemplary embodiments with reference to the attached drawings.

BRIEF DESCRIPTION OF THE DRAWINGS

FIG. 6 is a table showing consumable item information stored in a consumable item management server;

FIG. 7 is a table showing the consumable item information stored in a printing apparatus management server;

FIG. 8 is a sequence chart showing a sequence for enabling mutual access between servers;

FIGS. 9A and 9B are sequence charts each showing processing for registering a target printing apparatus;

FIG. 10 is a flowchart showing processing for transmitting remaining ink amount information in the printing apparatus management server;

DESCRIPTION OF THE EMBODIMENTS

Figure 1:
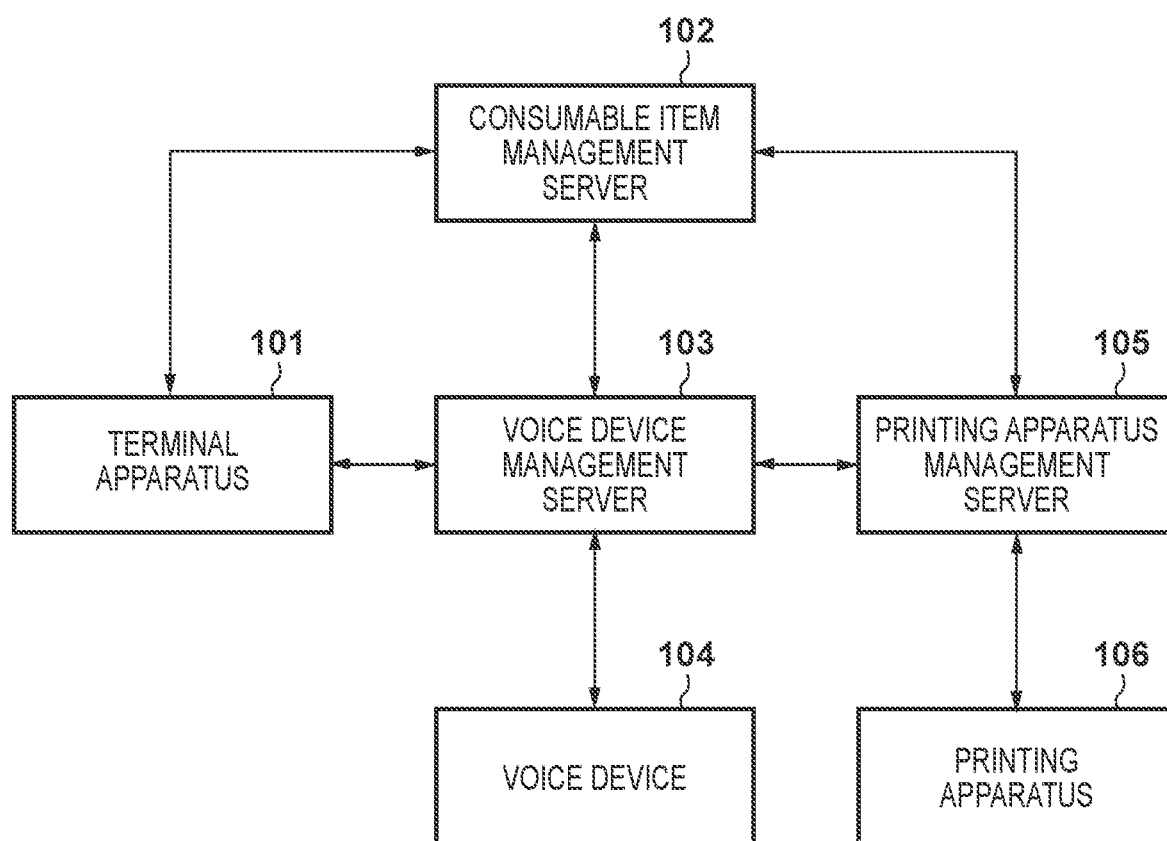
FIG. 1 is a block diagram showing the arrangement of a consumable item management system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Although Japanese Patent Laid-Open No. 2006-95984 discloses that a user will make voice instructions to change print settings and execute printing, it does not disclose how an order for consumable items to be used in a printing apparatus registered in a system can be placed.

According to one point of view of the present invention, an order for a consumable item to be used in a printing apparatus registered in a system can be placed by voice instruction.

[System Arrangement]

FIG. 1 is a block diagram showing the arrangement of a consumable item management system according to an embodiment. The consumable item management system according to this embodiment is formed by a terminal apparatus 101, a consumable item management server 102, a voice device management server 103, a voice device 104, a printing apparatus management server 105, and a printing apparatus 106. Note that although each of the voice device management server 103, the terminal apparatus 101, and the printing apparatus 106 is illustrated as a single apparatus in FIG. 1, a plurality of apparatuses may be arranged for each of these apparatuses in this embodiment. That is, a plurality of terminal apparatuses 101, a plurality of voice device 104, and a plurality of voice device management servers 103 may be communicably arranged. In addition, a plurality of printing apparatuses 106 may be communicably formed with the printing apparatus management server 105.

The terminal apparatus 101 is, for example, an arbitrary information processing apparatus such as a smartphone, a PC (Personal Computer), a tablet terminal, a mobile phone, a PDA (Personal Digital Assistant), or the like. The voice device 104 is, for example, a smart speaker. The printing apparatus 106 is a printer that discharges a printing agent such as ink to a print medium such as a print sheet to form (print) an image on the print medium. Note that the printing apparatus 106 may be an MFP (Multi-Functional Printer) that integrally has a plurality of functions such as a copy function, a FAX function, a print function, and the like. Note that in this embodiment, the printing apparatus 106 is assumed to be an apparatus that performs printing by an inkjet printing method. However, the present invention is not limited to this, and the printing apparatus 106 may also be an apparatus that performs printing by an electrophotographic method or a heat sublimation method.

The terminal apparatus 101 can mutually communicate with the consumable item management server 102 via a network such as the Internet or the like. In addition, each of the terminal apparatus 101 and the voice device 104 can mutually communicate with the voice device management server 103 via a network such as the Internet or the like. The voice device management server 103 is a server that provides a voice control service for implementing an interface for voice communication with a user, and manages the voice device 104 by associating the voice device 104 with the terminal apparatus 101. That is, pieces of information of a plurality of voice devices 104 are registered in the voice device management server 103, and each voice device 104 is associated with information of one of the terminal apparatuses 101 and user information of the voice control service.

The printing apparatus 106 can mutually communicate with the printing apparatus management server 105 via a network such as the Internet or the like. The printing apparatus management server 105 is a server that provides a printing apparatus management service for managing the printing apparatus 106 of each user registered in the printing apparatus management server 105. That is, in the printing apparatus management server 105, pieces of information of a plurality of printing apparatuses 106 are registered in association with corresponding pieces of user information. The printing apparatus management server 105 obtains, for example, the remaining amount information of a consumable item of a printing apparatus to manage the operating state of the printing apparatus.

The consumable item management server 102 is a server that performs, based on an instruction from the voice device management server 103, processing to place an order to a sales website (sales company) that deals with consumable items such as ink cartridges and the like.

In this embodiment, the forms of the terminal apparatus 101, the voice device 104, and the printing apparatus 106 are not particularly limited as long as the apparatuses can be connected to the Internet. For example, the apparatuses may be connected to the Internet via an access point (not shown). Note that the terminal apparatus 101, the voice device 104, and the printing apparatus 106 may be arranged to be communicable with each other by being connected to a local network by an access point (not shown). Alternatively, the terminal apparatus 101, the voice device 104, and the printing apparatus 106 may belong to different network segments.

Figure 2:
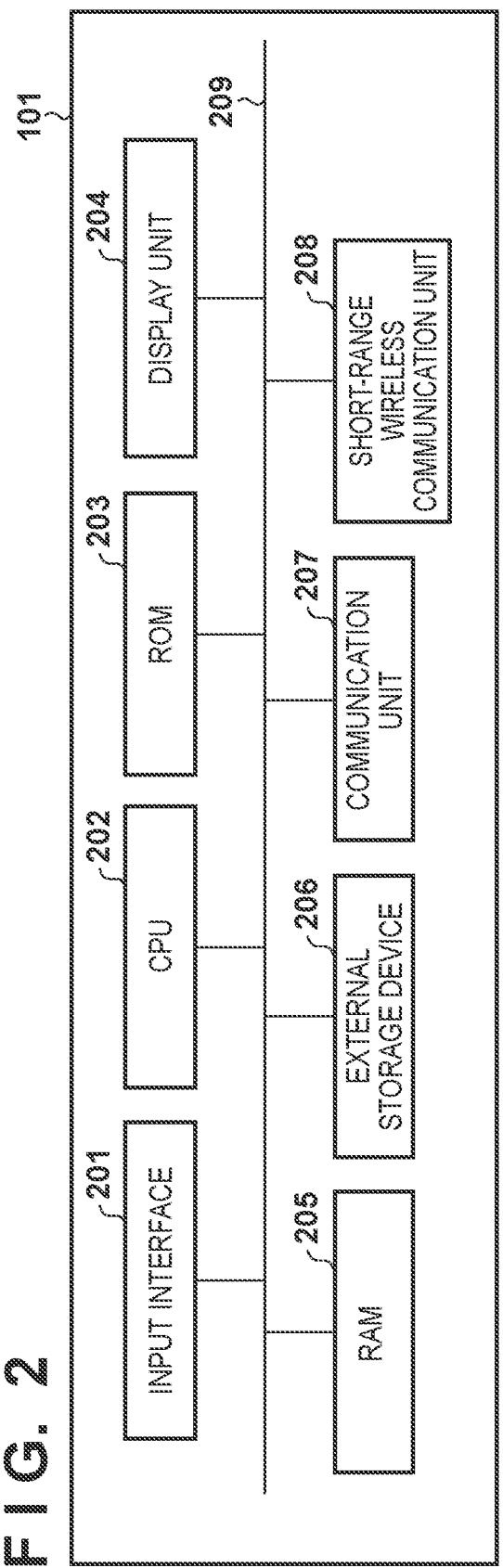
FIG. 2 is a block diagram showing the hardware arrangement of a terminal apparatus.

FIG. 2 is a block diagram showing an example of the hardware arrangement of the terminal apparatus 101. The terminal apparatus 101 includes an input interface 201, a CPU 202, a ROM 203, a display unit 204, a RAM 205, an external storage device 206, a communication unit 207, and a short-range wireless communication unit 208. The above-described blocks are connected to each other via, for example, an internal bus 209. In addition, in the arrangement of FIG. 2, a plurality of blocks may be arranged as a single block, or a single block may be divided and arranged as two or more blocks.

The CPU 202 is a system control unit and a processor for comprehensively controlling the entire terminal apparatus 101. The RAM 205 is formed by, for example, an SRAM (Static RAM) which requires a backup power supply. Note that since the RAM 205 holds data by a primary battery for data backup (not shown), it can store data such as program control variables and the like without volatility. A memory area for storing the setting information, the management data, and the like of the terminal apparatus 101 is arranged in the RAM 205. The RAM 205 is also used as the work memory and the main memory of the CPU 202. The ROM 203 stores permanent data such as control programs, data tables, OS programs, and the like to be executed by the CPU 202. Note that in this embodiment, an application program (voice control application) for controlling the voice device 104 is installed and stored in the ROM 203 of the terminal apparatus 101. Each operation of the terminal apparatus 101 according to this embodiment is implemented by, for example, causing the CPU 202 to read out a program stored in the ROM 203 to the RAM 205 and execute the program.

The display unit 204 is formed by, for example, an LED (Light-Emitting Diode) or an LCD (Liquid Crystal Display), and displays a screen based on various kinds of display data. Note that the display unit 204 may be formed by, for example, a touchscreen display and have a function of accepting various kinds of input operations from the user. That is, the display unit 204 is an interface for accepting data inputs and operation instructions from the user, and may be formed by an operation panel which includes a physical keyboard, buttons, a touch panel, or the like.

The communication unit 207 is formed by a circuit and an antenna for performing communication in accordance with a predetermined wireless communication method. For example, the communication unit 207 can wirelessly connect to an external access point. The communication unit 207 may also operate as a temporary access point. The communication unit 207 can operate in accordance with a wireless communication method (Wi-Fi) of a wireless LAN in compliance with IEEE802.11 standard series or may operate in accordance with another wireless communication method. The short-range wireless communication unit 208 executes short-range wireless communication with other apparatuses present within a predetermined short range of the terminal apparatus 101. Note that the short-range wireless communication unit 208 will perform communication by a wireless communication method different from that of the communication unit 207. For example, the short-range wireless communication unit 208 will operate in accordance with the Bluetooth® standard.

The terminal apparatus 101 is not limited to the arrangement shown in FIG. 2, and can appropriately include blocks corresponding to functions executable by the terminal apparatus 101.

Figure 3:
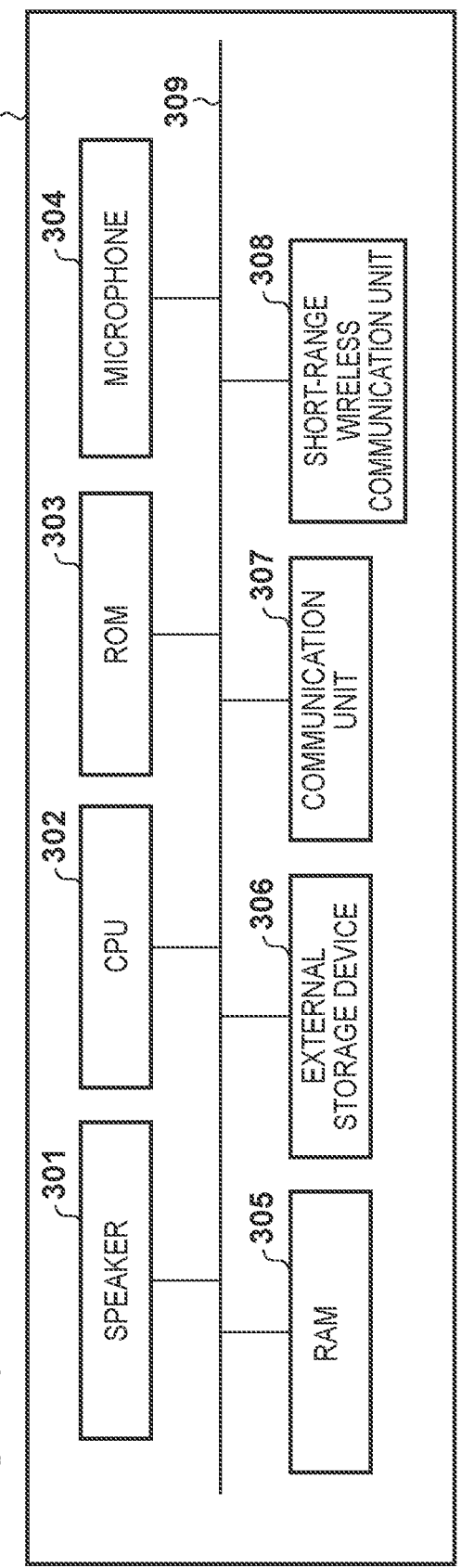
FIG. 3 is a block diagram showing the hardware arrangement of a voice device.

FIG. 3 is a block diagram showing an example of the hardware arrangement of the voice device 104. The voice device 104 includes a loudspeaker 301, a CPU 302, a ROM 303, a microphone 304, a RAM 305, an external storage device 306, a communication unit 307, and a short-range wireless communication unit 308. The above-described blocks are connected to each other via, for example, an internal bus 309. In addition, in the arrangement of FIG. 3, a plurality of blocks may be arranged as a single block, or a single block may be divided and arranged as two or more blocks.

The loudspeaker 301 executes voice output. The CPU 302 is a system control unit and a processor for comprehensively controlling the entire voice device 104. The ROM 303 stores various kinds of data and programs such as control programs, data tables, an embedded OS (Operating System) program, and the like to be executed by the CPU 302. In this embodiment, each control program stored in the ROM 303 will be a target of software execution control operations such as scheduling, task switching, interrupt processing, and the like performed under the management of the embedded OS stored in the ROM 303. Each operation of the voice device 104 according to the embodiment is implemented by, for example, causing the CPU 302 to read out a program stored in the ROM 303 to the RAM 305 and execute the program. The microphone 304 receives sounds emitted in the periphery of the voice device 104. For example, the microphone 304 receives the voice of the user. The RAM 305 is formed by, for example, a DRAM (Dynamic RAM) which requires a backup power supply. The RAM 305 can be used as the work memory and the main memory of the CPU 302. The external storage device 306 stores application software.

The communication unit 307 is formed by a circuit and an antenna for performing communication in accordance with a predetermined wireless communication method. For example, the communication unit 307 can wirelessly connect to an external access point. The communication unit 307 may also operate as a temporary access point. The communication unit 307 can operate in accordance with a wireless communication method (Wi-Fi) of a wireless LAN in compliance with IEEE802.11 standard series or may operate in accordance with another wireless communication method. The short-range wireless communication unit 308 executes short-range wireless communication with other apparatuses present within a predetermined short range of the voice device 104. Note that the short-range wireless communication unit 308 will perform communication by a wireless communication method different from that of the communication unit 307. For example, the short-range wireless communication unit 308 will operate in accordance with the Bluetooth® standard.

The voice device 104 is not limited to the arrangement shown in FIG. 3, and can appropriately include blocks corresponding to functions executable by the voice device 104.

Figure 4:
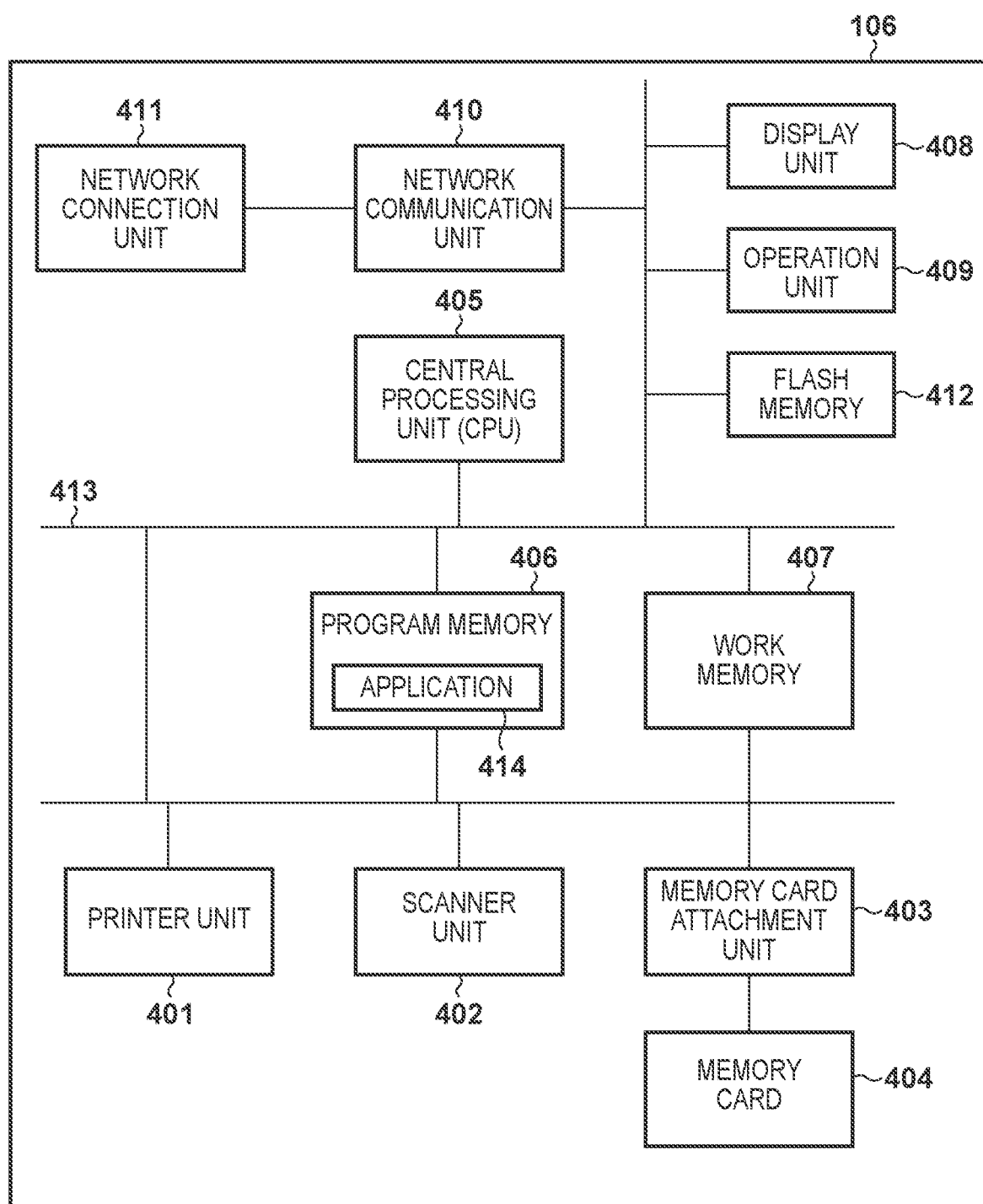
FIG. 4 is a block diagram showing the hardware arrangement of a printing apparatus.

FIG. 4 is a block diagram showing an example of the hardware arrangement of the printing apparatus 106. FIG. 4 shows an example in which the printing apparatus 106 is arranged as an MFP. In the printing apparatus 106, the print function is implemented by a printer unit 401. Also, the scanner function is implemented by a scanner unit 402, and the storage function is implemented by a memory card attachment unit 403 and a memory card 404.

The printer unit 401 executes printing based on, for example, image data received from an external device or image data stored in the memory card 404. In addition, the printer unit 401 stores pieces of consumable item information such as ink information concerning a remaining ink amount and the like, sheet information concerning a remaining sheet amount and the like, and the like. The printing apparatus 106 transmits printing apparatus status information such as this remaining ink amount information and the like to the printing apparatus management server 105. The scanner unit 402 optically reads an original set on an original table (not shown), converts the read original into electronic data, and further converts the electronic data into data of a designated file format to generate image data. The scanner unit 402 will subsequently transmit the generated image data to an external device via a network or store the generated image data in a storage area (not shown) such as an HDD or the like. In the printing apparatus 106, the copy function is implemented by causing the scanner unit 402 to read an original set on the original table and transfer the generated data to the printer unit 401, and causing the printer unit 401 to print, onto a print sheet, an image based on the image data.

The memory card 404 attached to the memory card attachment unit 403 stores various kinds of file data. The file data can be read out from and be edited by an external device via a network. The file data can also be stored in the memory card 404 from an external device via a network.

Furthermore, the printing apparatus 106 includes, a CPU 405, a program memory 406, a work memory 407, a display unit 408, an operation unit 409, a network communication unit 410, a network connection unit 411, and a flash memory 412. The CPU 405 is a processor for comprehensively controlling the units of the printing apparatus 106. The program memory 406 is formed by a ROM or the like, and stores various kinds of program codes and an application 414 for communicating with the printing apparatus management server 105. The application 414 accesses the printer unit 401 to obtain consumable item information such as the ink information, the sheet information, and the like. The work memory 407 is formed by a RAM or the like, and temporarily stores and buffers image data or the like at the execution of each service. Each operation of the printing apparatus 106 according to this embodiment is implemented by, for example, causing the CPU 405 to read out a program stored in the program memory 406 to the work memory 407 and execute the program.

The display unit 408 is formed by, for example, an LED (Light-Emitting Diode) or an LCD (Liquid Crystal Display), and displays a screen based on various kinds of display data. The operation unit 409 includes switches for the user to perform various kinds of input operations. The network communication unit 410 is connected to a network such as the Internet via the network connection unit 411, and performs various kinds of communication. Note that the network communication unit 410 has an arrangement corresponding to the medium of the network, and communicates by using, for example, a wired LAN or wireless LAN. For example, in a case in which the network communication unit 410 supports the wired LAN, the network connection unit 411 will be a connector for connecting the cable of the wired LAN. In a case in which the network communication unit 410 supports the wireless LAN, the network connection unit 411 will be an antenna. Note that the network connection unit 411 may support both the wired LAN and the wireless LAN. In this embodiment, the network communication unit 410 supports, for example, the wireless LAN, and can connect to an access point in accordance with a wireless communication method of the wireless LAN in compliance with the IEEE802.11 standard series. The flash memory 412 is a nonvolatile memory for storing image data and the like received by the network communication unit 410.

The above-described blocks are connected to each other via, for example, a bus 413. In addition, in the arrangement of FIG. 4, a plurality of blocks may be arranged as a single block, or a single block may be divided and arranged as two or more blocks. The printing apparatus 106 is not limited to the arrangement shown in FIG. 4, and can appropriately include blocks corresponding to functions executable by the printing apparatus 106.

Figure 5:
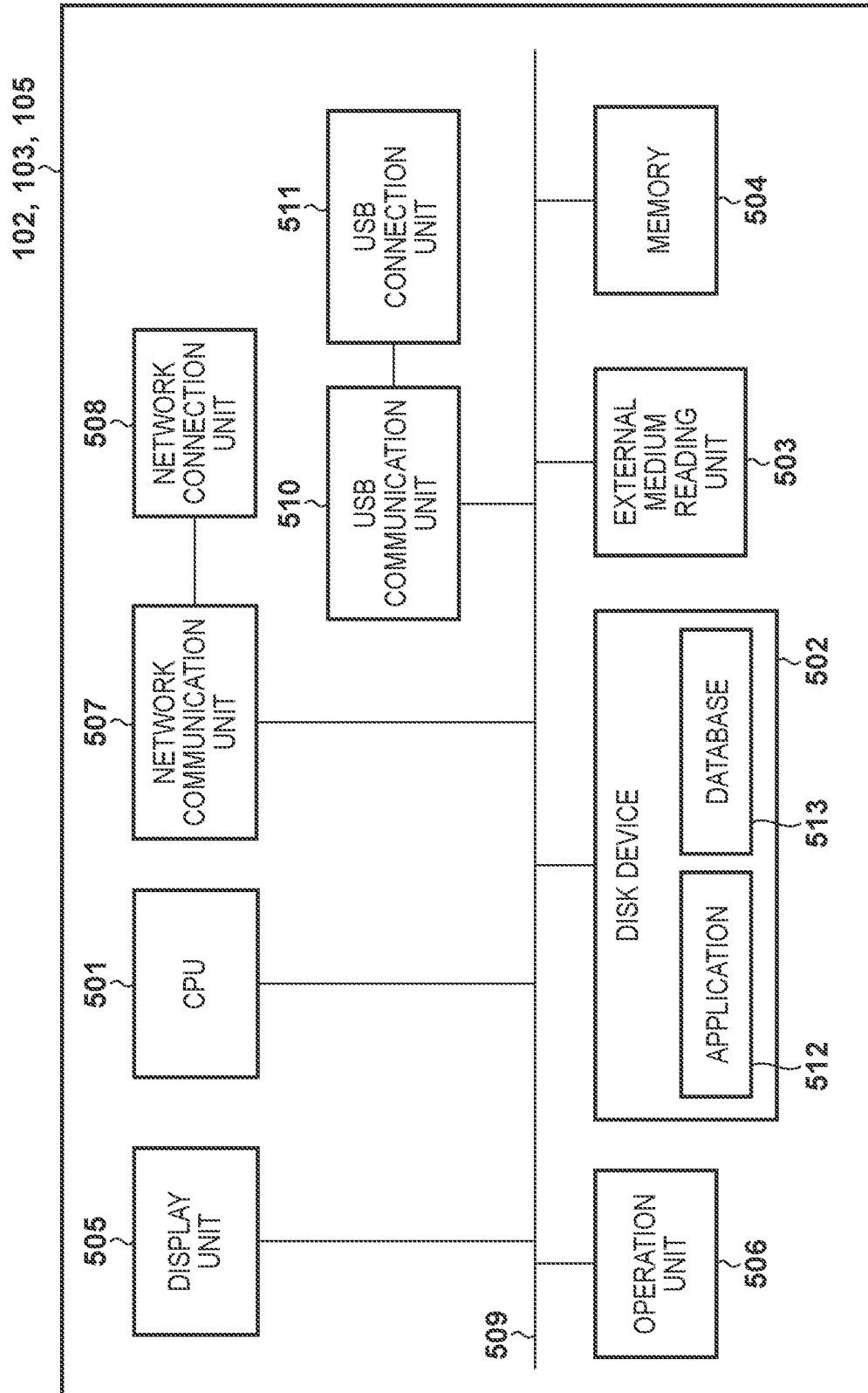
FIG. 5 is a block diagram showing the hardware arrangement of a server.

FIG. 5 is a block diagram showing an example of the hardware arrangement of each of the consumable item management server 102, the voice device management server 103, and the printing apparatus management server 105. In this embodiment, assume that the servers will have a common arrangement as shown in FIG. 5. However, the servers may have different arrangements in accordance with the functions of the respective servers. In addition, in this example, assume that each of the consumable item management server 102, the voice device management server 103, and the printing apparatus management server 105 is formed by one server apparatus (information processing apparatus). However, the servers of this embodiment may implement the respective functions of the servers by causing the plurality of server apparatuses to operate in cooperation with each other. In this specification, assume that a "server" will refer to both an arrangement formed by a single server apparatus and an arrangement formed by a plurality of server apparatuses.

A CPU 501 is a processor for comprehensively controlling the entire apparatus in which it is incorporated. A disk device 502 stores various kinds of files in addition to an OS, a database 513, and an application program 512 to be read out and executed by the CPU 501. An external medium reading unit 503 can read out information such as a file stored in an external storage medium such as an SD card or the like. A memory 504 is formed by a RAM or the like, and is used for, for example, temporarily storing or buffering data by the CPU 501. Each operation of each server according to this embodiment is implemented by, for example, causing the CPU 501 of each server to read out a program stored in the disk device 502 to the memory 504 and execute the program.

A display unit 505 is formed by, for example, an LED (Light-Emitting Diode) or an LCD (Liquid Crystal Display), and displays a screen based on various kinds of display data. An operation unit 506 includes, for example, a keyboard and a mouse for the user to perform various kinds of input operations. A network communication unit 507 is connected to a network such as the Internet via a network connection unit 508, and performs various kinds of communication. Note that the network communication unit 507 has an arrangement corresponding to the medium of the network, and communicates by using, for example, a wired LAN or wireless LAN. For example, in a case in which the network communication unit 507 supports the wired LAN, the network connection unit 508 will be a connector for connecting the cable of the wired LAN. In a case in which the network communication unit 507 supports the wireless LAN, the network connection unit 508 will be an antenna. Note that the network connection unit 508 may support both the wired LAN and the wireless LAN. A USB communication unit 510 (Universal Serial Bus) is connected to various kinds of peripheral apparatuses via a USB connection unit 511, and can perform various kinds of communication in compliance with the USB standard.

The above-described blocks are connected to each other via, for example, a bus 509. In addition, in the arrangement of FIG. 5, a plurality of blocks may be arranged as a single block, or a single block may be divided and arranged as two or more blocks. Each of the consumable item management server 102, the voice device management server 103, and the printing apparatus management server 105 is not limited to the arrangement shown in FIG. 5, and can appropriately include blocks corresponding to functions executable by each server.

Databases corresponding to the consumable item management server 102, the voice device management server 103, and the printing apparatus management server 105 are constructed in the database 513. A database corresponding to each consumable item as shown in FIG. 6 (to be described later) is constructed in the consumable item management server 102. A database in which authentication information (first authentication information) for accessing the printing apparatus management server 105, information of the terminal apparatus 101, login user information of the voice control service provided by the voice device management server 103, information of the voice device 104, and information of the printing apparatus 106 are associated is constructed in the voice device management server 103. A database in which authentication information (second authentication information) for accessing the consumable item management server 102, information of a login user of the printing apparatus management server 105, and information of the printing apparatus 106 corresponding to the login user are associated is constructed in the printing apparatus management server 105. In addition, the first authentication information stored in the databased of the voice device management server 103 is information issued by the printing apparatus management server 105, and it is preferable for the printing apparatus management server 105 to also store the issued first authentication information in the database. In this embodiment, databases will be constructed in respective servers as described above to implement a voice order placement system (consumable item management system) for consumable items of each printing apparatus managed by a printing apparatus management system. A user who has been registered in the printing apparatus management system to be provided by the printing apparatus management server 105 may be particularly referred to as a "login user" hereinafter. In this embodiment, the login user corresponds to the user of the voice device 104 and the terminal apparatus 101.

[Pre-Registration Processing]

In the consumable item management system according to this embodiment, when the remaining amount of a consumable item of the printing apparatus 106 has decreased below a threshold, voice notification is performed to the user. The user can respond to this notification to place an order for this consumable item by voice. In this embodiment, an ink cartridge will be described as an example of a consumable item of the printing apparatus 106. However, other consumable items may also be used, and for example, copy paper may be used as a consumable item of the printing apparatus 106. In addition, since an example in which an order will be placed to a sales company to which the user has placed an order for the consumable item once before will be described in this embodiment, a case in which the user will place a reorder will be described.

An administrator of the consumable item management system registers, in advance, the consumable item information of the printing apparatus 106 in the consumable item management server 102. FIG. 6 is a table showing an example of information registered in the database 513 of the consumable item management server 102. Consumable item information 600 includes items 601 to 605. The item 601 indicates an order ID which is a value uniquely added to each ink cartridge attachment portion of the printing apparatus 106. The item 602 indicates an ink color, and the item 603 indicates a product code of the ink cartridge. Also, the item 605 indicates a model name of the printing apparatus 106.

For example, information of the order ID/color/product code of each of black, cyan, magenta, and yellow ink cartridges attachable to the printing apparatus 106 having a model name "AAAA" is shown in FIG. 6. That is, the printing apparatus 106 which has the model name "AAAA" is a printing apparatus to which ink tanks corresponding to four colors can be attached. In addition, information of the order ID/color/product code of each of pigment black, black, cyan, magenta, yellow, and gray ink cartridges attachable to the printing apparatus 106 having a model name "BBBB" is shown in FIG. 6. That is, the printing apparatus 106 which has the model name "BBBB" is a printing apparatus to which ink tanks corresponding 6 colors can be attached. Note that there are device types in which both a standard-capacity ink tank and a high-capacity ink tank can be attached to the ink cartridge attachment portions of the printing apparatus 106. In such a case, a plurality of product codes will be registered for the same order ID.

The item 604 indicates a threshold for determining the reduction in the remaining ink amount of an ink tank corresponding to an ink tank cartridge attachment portion of the printing apparatus 106, and this threshold is set for each order ID. Although a ratio (percentage) with respect to a maximum capacity is used as a unit of the threshold in FIG. 6, another unit may be used as long as it is an index that indicates the remaining ink amount. For example, the volume (milliliter or the like) may be used as the unit of the threshold. Since a threshold will be set for each order ID in this embodiment, reorder placement processing can be executed early for, for example, highly consumed black ink by setting a higher threshold for black ink than for the thresholds of other color inks.

The consumable item information 600 of FIG. 6 that is pre-registered in the consumable item management server 102 by the administrator of the consumable item management system is also registered in the database 513 of the printing apparatus management server 105. In this case, as long as the correspondence relationship between the order IDs and the printing apparatuses 106 of the consumable item information 600 can be maintained, the data format to be registered may differ from that registered in the consumable item management server 102.

FIG. 7 is a table showing an example of information registered in the printing apparatus management server 105. Consumable item information 700 shown in FIG. 7 includes items 701 to 703. The item 701 indicates a model name and corresponds to the model name of the item 605 of FIG. 6. The item 703 indicates an order ID list. As shown in FIG. 7, the order IDs corresponding to the model names of the item 605 in FIG. 6 have been listed in the order ID list. The consumable item information 700 may include information not included in the consumable item information 600, and the information of the item 702 is included in the consumable item information 700 in this embodiment. The item 702 indicates information of ink destination information. Note that "ink destination information" is information indicating the sales area (country or region) of the ink cartridge. Based on the ink destination information, the printing apparatus management server 105 can determine, for example, whether an order for the ink cartridge attached to the printing apparatus 106 can be placed in the consumable item management system.

[Authentication Information Registration Processing]

FIG. 8 is a sequence chart showing a sequence for enabling mutual access between the voice device management server 103, the consumable item management server 102, and the printing apparatus management server 105. First, the user uses the terminal apparatus 101, which is pre-associated with the voice device 104 in the voice control system, to execute processing for obtaining, from the voice device management server 103, the first authentication information required to access the printing apparatus management server 105. That is, based on a user instruction, the terminal apparatus 101 will request the voice device management server 103 to obtain authorization from the printing apparatus management server 105 (S801). This user instruction for making this authorization request may be executed on a screen provided by a local application installed in the terminal apparatus 101 or may be executed on a screen of a webpage provided by the voice device management server 103 via a web browser.

Upon receiving an authorization request to the printing apparatus management server 105 from the terminal apparatus 101, the voice device management server 103 transmits an authorization request to an authorization endpoint of the printing apparatus management server 105 (S802). The printing apparatus management server 105 that received the authorization request will transmit authentication screen data for performing authentication to the terminal apparatus 101 designated in the authorization request (S803). Upon receiving the authentication screen data from the printing apparatus management server 105, the terminal apparatus 101 will display an authentication screen on the display unit 204.

The user inputs, on the authentication screen displayed on the display unit 204 of the terminal apparatus 101, the authentication information of the user himself/herself registered in the printing apparatus management server 105. After the authentication information has been input, the terminal apparatus 101 transmits the input authentication information to the printing apparatus management server 105 (S804). The authorization request will be approved as a result of the transmission of this authentication information. For example, a user ID and a password which have been pre-registered to be used for logging into the printing apparatus management system of the printing apparatus management server 105 are transmitted as the authentication information.

The printing apparatus management server 105 verifies the authentication information transmitted from the terminal apparatus 101. If authentication succeeds as a result of the verification, the printing apparatus management server 105 will transmit a first authorization code to the voice device management server 103 (S805). The voice device management server 103 will transmit, to a token endpoint of the printing apparatus management server 105, the authorization code received in S805 (S806). Upon receiving the authorization code in S806, the printing apparatus management server 105 issues the first authentication information to the voice device management server 103 (S807). The first authentication information is information necessary for the voice device management server 103 to access the printing apparatus management server 105, and is, for example, an access token or a refresh token. Upon receiving the first authentication information in S807, the voice device management server 103 will associate the first authentication information with the information of the terminal apparatus 101 and the voice device 104 and store the associated information in the database 513 (S808).

Processing for obtaining the second authentication information which is necessary for accessing the consumable item management server 102 from the printing apparatus management server 105 will be executed next. Note that in this embodiment, it is assumed that common authentication information can be used for the voice device management server 103 and the consumable item management server 102. Hence, at the stage in which it has become possible for the voice device management server 103 to access the printing apparatus management server 105, the voice device management server 103 will transmit the authorization code to the printing apparatus management server 105 instead of the consumable item management server 102 transmitting the authorization code to the printing apparatus management server 105. That is, after storing the first authentication information in S808, the voice device management server 103 will transmit a second authorization code to the printing apparatus management server 105 (S809).

The printing apparatus management server 105 will transmit, to the consumable item management server 102, the second authorization code received from the voice device management server 103 (S810). When the authorization processing has been normally completed in the consumable item management server 102, the consumable item management server 102 will issue and transmit the second authentication information to the printing apparatus management server 105 (S811). The second authentication information is authentication information necessary for accessing the consumable item management server 102. The printing apparatus management server 105 will associate the second authentication information, which has been transmitted from the consumable item management server 102 in S811, with the first authentication information and the login user information of the printing apparatus management server 105, and store the associated information in the database 513 (S812). The login user information is, for example, the user ID and the password transmitted in S804. That is, in the database 513 of the printing apparatus management server 105, the first authentication information, the second authentication information, and the login user information are associated with the information of the printing apparatus 106 corresponding to the login user.

As described above, the voice device management server 103 will be able to use the first authentication information to access the printing apparatus management server 105, and the printing apparatus management server 105 will be able to use the second authentication information to access the consumable item management server 102.

[Processing for Registering Printing Apparatus to Voice Device Management Server 103]

Processing for registering a printing apparatus to the voice device management server 103 will be described next with reference to FIGS. 9A and 9B. FIG. 9A is a sequence chart showing the processing for newly registering, in the voice device management server 103, a printing apparatus to be linked to the voice device management server 103. The processing of FIG. 9A is performed after the first authentication information is stored in the database 513 in S808. The voice device management server 103 will use the first authentication information to inquire about the printing apparatus registered in the printing apparatus management server 105 (S901). Based on the first authentication information transmitted from the voice device management server 103, the printing apparatus management server 105 specifies the login user of the printing apparatus management server 105. That is, the user account that is logged into the printing apparatus management server 105 is specified. Subsequently, the printing apparatus management server 105 obtains the information of the target printing apparatus 106 registered and linked to the specified login user (S902).

The target printing apparatus 106 here is a printing apparatus that is registered in the printing apparatus management server 105 by being linked to the login user of the printing apparatus management server 105, and is a printing apparatus that is registered as the printing apparatus to be actually used in the service of the printing apparatus management server 105. Hence, if there are a plurality of printing apparatuses registered in the printing apparatus management server 105, the information of the printing apparatus registered as a target which is to use the service of the printing apparatus management server 105 can be obtained from the information of the plurality of registered printing apparatuses. The information of the target printing apparatus 106 to be obtained in S902 includes identification information such as a serial ID and the like of the printing apparatus, the model name of the printing apparatus, and the destination information of each consumable item to be used in the printing apparatus.

In this embodiment, the target printing apparatus registered in the printing apparatus management server 105 will basically be the target printing apparatus to be linked to the voice device management server 103. Furthermore, in this embodiment, it is preferable for the target printing apparatus to be linked to the voice device management server 103 to be the same as the target printing apparatus to be registered in the consumable item management system. Hence, it is preferable to determine whether the device type of target printing apparatus temporarily registered in the printing apparatus management server 105 is a device type supported by the consumable item management service according to this embodiment. That is, in S902, it is preferable to determine whether the device type of the target printing apparatus is a device type supported by the consumable item management service, and obtain the information of the target printing apparatus if it is determined that the target printing apparatus is a supported device type. If it is determined that the device type of the target printing apparatus is not a supported device type, the information of the target printing apparatus will not be obtained.

Note that as described above, there may be a case in which a plurality of printing apparatuses that are owned by a single login user are registered in the printing apparatus management server 105. For example, consider a case in which a single user has registered 10 or more printing apparatuses in the printing apparatus management server 105. In such a case, timeout of the printing apparatus management server 105 may occur if the printing apparatus management server 105 tries to obtain the information of all of the printing apparatuses 106. Hence, in this embodiment, for example, the printing apparatus management server 105 will set, as the target printing apparatus 106, one of the plurality of printing apparatuses 106 corresponding to the user. Subsequently, the printing apparatus management server 105 will obtain the information of the set target printing apparatus. However, a plurality of the target printing apparatuses 106 may be set to be registered if timeout is not a problem. The selection of the target printing apparatus 106 can be set based on, for example, the setting operation performed by the login user of the printing apparatus management server 105. Alternatively, it may be arranged so that the information of the plurality of printing apparatuses 106 registered in the printing apparatus management server 105 will be obtained at once as the information of the target printing apparatuses 106 within an obtainable range such as within a timeout time or the like.

If the target printing apparatus 106 is registered in the consumable item management system according to this embodiment when the target printing apparatus 106 is already registered in another service for automatic order placement of a consumable item here, duplicate orders for ink cartridges may be placed against the intention of the user. Hence, in this embodiment, in S903, the printing apparatus management server 105 will determine, based on the registration history of each printing apparatus 106, whether the target printing apparatus 106 is registered in another consumable item order placement system. Note that "another consumable item order placement system" in this example refers to a service that obtains, in a manner similar to the consumable item order placement system according to this embodiment, the remaining amount information of a consumable item from the printing apparatus management server 105.

If it is determined that the target printing apparatus is not registered in another consumable item order placement system, the printing apparatus management server 105 will determine to set the obtained information of the target printing apparatus 106 as the target information to be subsequently transmitted to the voice device management server 103 in S904. On the other hand, if it is determined that the target printing apparatus is registered in another consumable item order placement system, the printing apparatus management server 105 will determine not to set the obtained information of the target printing apparatus 106 as the target information to be subsequently transmitted to the voice device management server 103 in S904. By providing such a determination arrangement, this embodiment will be able to prevent a state in which an order for the consumable item is placed twice. That is, it will be possible to prevent duplicate orders for the same consumable item from being placed in two or more services based on the remaining amount information of the consumable item obtained from the same printing apparatus management server 105. The following determination is further performed in S903. The printing apparatus management server 105 collates the obtained information of the target printing apparatus 106 with the consumable item information 700 of FIG. 7. Subsequently, the printing apparatus management server 105 determines whether the obtained information on the model name and the ink destination of the target printing apparatus 106 matches the information in the consumable item information 700 of FIG. 7. If it is determined that the obtained information matches the information in the consumable item information, the printing apparatus management server 105 will determine to set the obtained information of the target printing apparatus 106 as the target information to be subsequently transmitted to the voice device management server 103 in S904. On the other hand, if it is determined that the obtained information does not match, the printing apparatus management server 105 will determine not to set the obtained information of the target printing apparatus 106 as the target information to be subsequently transmitted to the voice device management server 103 in S904.

In this manner, according to this embodiment, the printing apparatus management server 105 obtains, in response to the inquiry from the voice device management server 103, the information of the printing apparatus 106 corresponding to the login user of the printing apparatus management server 105. Thereafter, based on the obtained information, determination as to whether the target printing apparatus is already registered in another consumable item order placement system and determination as to whether the information of the target printing apparatus matches the information stored in advance in the consumable item information 700 are executed. Subsequently, whether to set the obtained information as target information to be transmitted in response to the inquiry from the voice device management server 103 is determined based on the determination result.

The printing apparatus management server 105 will transmit, to the voice device management server 103, the serial ID and the corresponding order ID list of the target printing apparatus 106 set as the target information to be transmitted in response to the inquiry from the voice device management server 103 (S904). On the other hand, if it is determined not to set the obtained information as the target information to be transmitted in response to the inquiry from the voice device management server 103, the printing apparatus management server 105 will not transmit the serial ID and the corresponding order ID list described above. If it is determined that the serial ID and the corresponding ID list to be transmitted are not present, the printing apparatus management server 105 will transmit information indicating the absence of the target printing apparatus 106 to be registered to the voice device management server 103.

The voice device management server 103 will receive and store the serial ID and the corresponding order ID list of the target printing apparatus 106 transmitted from the printing apparatus management server 105 (S905). In step S905, the voice device management server 103 associates the information of the terminal apparatus 101 and the voice device 104, the first authentication information, and the serial ID and the corresponding order ID list of the target printing apparatus 106 and stores the associated information in the database 513. This may be performed by updating the information stored in the database 513 in S808. As a result of the processing of FIG. 9A, the information of the terminal apparatus 101, the information of the voice device 104, the first authentication information, and the information of the target printing apparatus 106 will be associated with each other in the database 513 of the voice device management server 103.

Processing for changing the target printing apparatus will be described next. FIG. 9B is a sequence chart showing processing for registering the changed target printing apparatus 106 in the voice device management server 103.

In a case in which the login user has registered the plurality of printing apparatuses 106 in the printing apparatus management server 105, the user may change the target printing apparatus 106 in the printing apparatus management server 105. In such a case, the printing apparatus management server 105 will obtain the information of the changed target printing apparatus 106 (S911). Then, in a manner similar to S903, the printing apparatus management server 105 will determine, based on the obtained information of the target printing apparatus 106, whether the changed target printing apparatus is already registered in another consumable item order placement system and whether the obtained information matches that in the consumable item information 700 (S912). Subsequently, based on the determination results, the printing apparatus management server 105 will determine whether to set the obtained information as the target information to be transmitted to the voice device management server 103.

The printing apparatus management server 105 will transmit, in a manner similar to S904, the serial ID and the corresponding order ID list of the target printing apparatus 106 determined to be set as the target information to be transmitted to the voice device management server 103 (S913). Subsequently, the voice device management server 103 will receive, in a manner similar to S905, the serial ID and the corresponding order ID list of the target printing apparatus 106 transmitted from the printing apparatus management server 105, and store the received information in the database (S914). As a result, the information stored in the database 513 in S905 is updated.

In this manner, according to this embodiment, in a case in which the login user of the voice device management server 103 has changed the target printing apparatus 106 among the plurality of printing apparatuses, this change can be reflected in the voice device management server 103.

[Remaining Ink Amount Information Transmission Processing]

A procedure in which the printing apparatus management server 105 transmits the remaining ink amount information obtained from the printing apparatus 106 to the consumable item management server 102 will be described next with reference to FIG. 10.

FIG. 10 is a flowchart showing the processing in which the printing apparatus management server 105 transmits the remaining ink amount information obtained from printing apparatus 106 to the consumable item management server 102. The processing of FIG. 10 is implemented by, for example, causing the CPU 501 of the printing apparatus management server 105 to execute a program. In addition, the processing of FIG. 10 can be started at a timing at which the printing apparatus 106 has executed print processing, a timing at which the printing apparatus management server 105 has obtained the remaining ink amount from the printing apparatus 106, or a predetermined time.

The CPU 501 determines whether the remaining ink amount information has been received from the printing apparatus 106 (step S1001). The process of step S1001 is repeated until it is determined that the remaining ink amount information has been received. Note that the serial ID of the printing apparatus 106 is included in the remaining ink amount information received from the printing apparatus 106. When it is determined that the remaining ink amount information has been received, the CPU 501 will refer to the database 513 based on the serial ID of the printing apparatus 106 included in the remaining ink amount information, and obtain the login user information stored in S812 (step S1002).

Next, the CPU 501 determines whether the second authentication information corresponding to the login information obtained in step S1002 is present (step S1003). If it is determined that the second authentication information is present, the CPU 501 will use the second authentication information to transmit, to the consumable item management server 102, the serial ID and the remaining ink amount information of each order ID corresponding to the serial ID received from the printing apparatus 106 (step S1004). Subsequently, the processing of FIG. 10 ends. On the other hand, if it is determined that the second authentication information is absent in step S1003 (step S1003), it will be determined that the printing apparatus is the printing apparatus 106 which is not registered in the voice device management server 103, and the processing of FIG. 10 will be ended without executing the information transmission to the consumable item management server 102.

In this manner, according to this embodiment, the printing apparatus management server 105 can execute control so as not to transmit, to the consumable item management server 102, the remaining ink amount information of the printing apparatus 106 which is not registered in the voice device management server 103.

[Remaining Ink Amount Notification Determination Processing]

The procedure of processing in which the consumable item management server 102 which received the remaining ink amount information from the printing apparatus management server 105 determines the remaining ink amount and transmits the remaining ink amount information to the voice device management server 103 will be described next with reference to FIG. 11.

Figure 11:
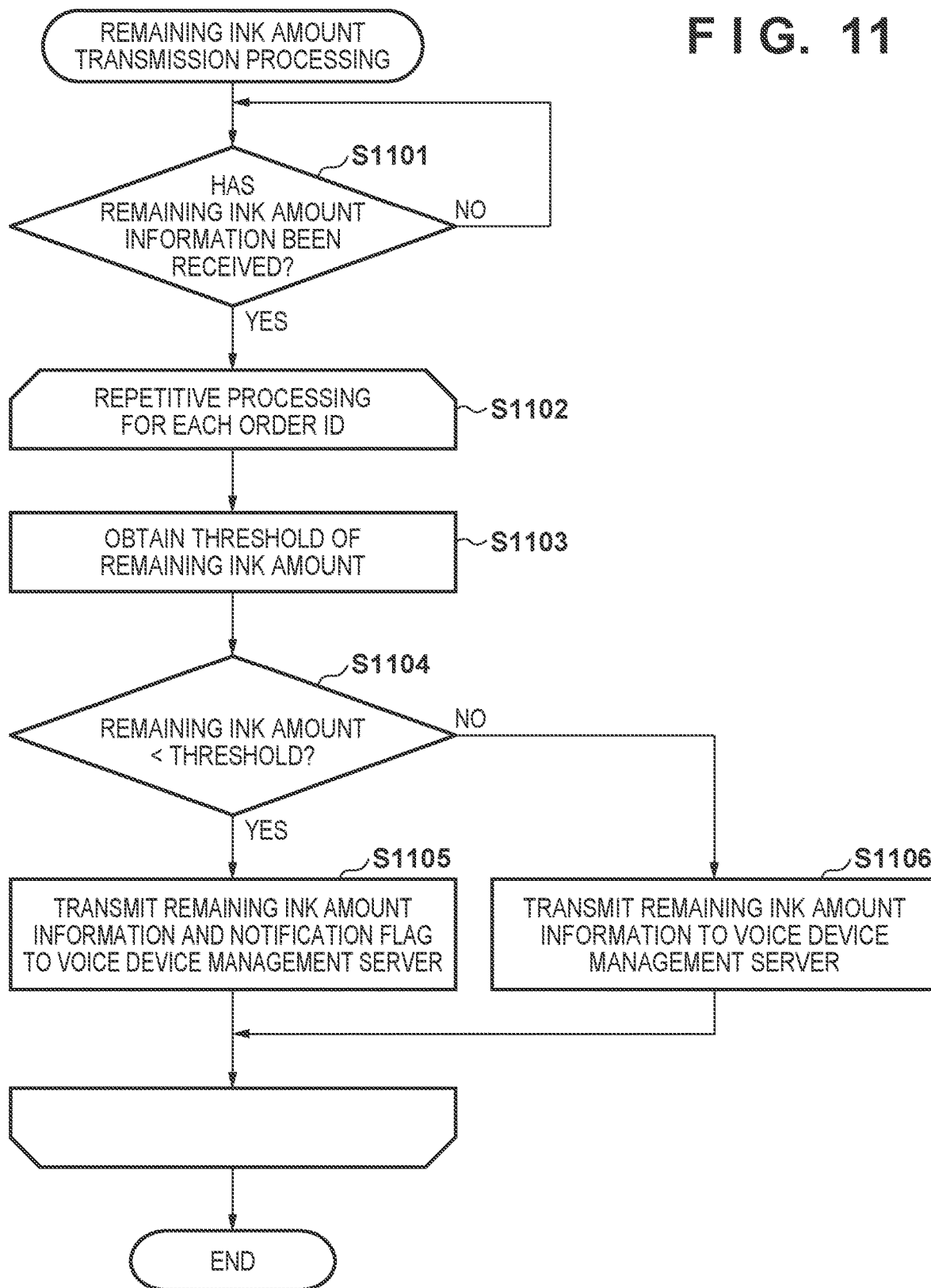
FIG. 11 is a flowchart showing remaining ink amount determination processing performed in the consumable item management server.

FIG. 11 is a flowchart showing the processing in which the consumable item management server 102, which received the remaining ink amount information from the printing apparatus management server 105, determines the remaining ink amount and transmits the remaining ink amount information to the voice device management server 103. The processing of FIG. 11 is implemented by, for example, causing the CPU 501 of the printing apparatus management server 105 to execute a program.

The CPU 501 determines whether the remaining ink amount information has been received from the printing apparatus management server 105 (step S1101). The process of step S1101 is repeated until it is determined that the remaining ink amount information has been received. When it is determined that the remaining ink amount information has been received, the CPU 501 will perform the subsequent processes for each order ID included in the received remaining ink amount information (step S1102). That is, the processes from step S1102 to step S1106 are repetitively executed for the number of ink cartridges of a plurality of ink colors.

The CPU 501 obtains, from the consumable item information 600 of FIG. 6, the threshold of the remaining ink amount corresponding to the order ID (step S1103). Subsequently, the CPU 501 determines whether the remaining ink amount is below the threshold (step S1104). If it is determined that the remaining ink amount is below the threshold (less than the threshold), the CPU 501 will transmit, to the voice device management server 103, the serial ID, the ink color, the order ID, the remaining ink amount information, and a notification flag representing that the user will be notified via the voice device 104 (step S1105).

On the other hand, if it is determined in step S1104 that the remaining ink amount is not below the threshold (the threshold or more), the CPU 501 will transmit the serial ID, the ink color, the order ID, and the remaining ink amount information to the voice device management server 103 (step S1106). In this case, it may be arranged so a notification flag representing that the user will not be notified via the voice device 104 will be transmitted.

The processes described above are repetitively executed for the number of order IDs (the number of ink cartridges) included in the remaining ink amount information received from the printing apparatus management server 105. When the processes have been performed for all of the order IDs, the processing of FIG. 11 ends.

[Voice Notification Processing and Order Placement Processing]

A procedure of processing from when the voice device management server 103 notifies the user about the reduction in the remaining ink amount until the voice device management server 103 instructs the consumable item management server 102 to place an order will be described next with reference to FIG. 12.

Figure 12:
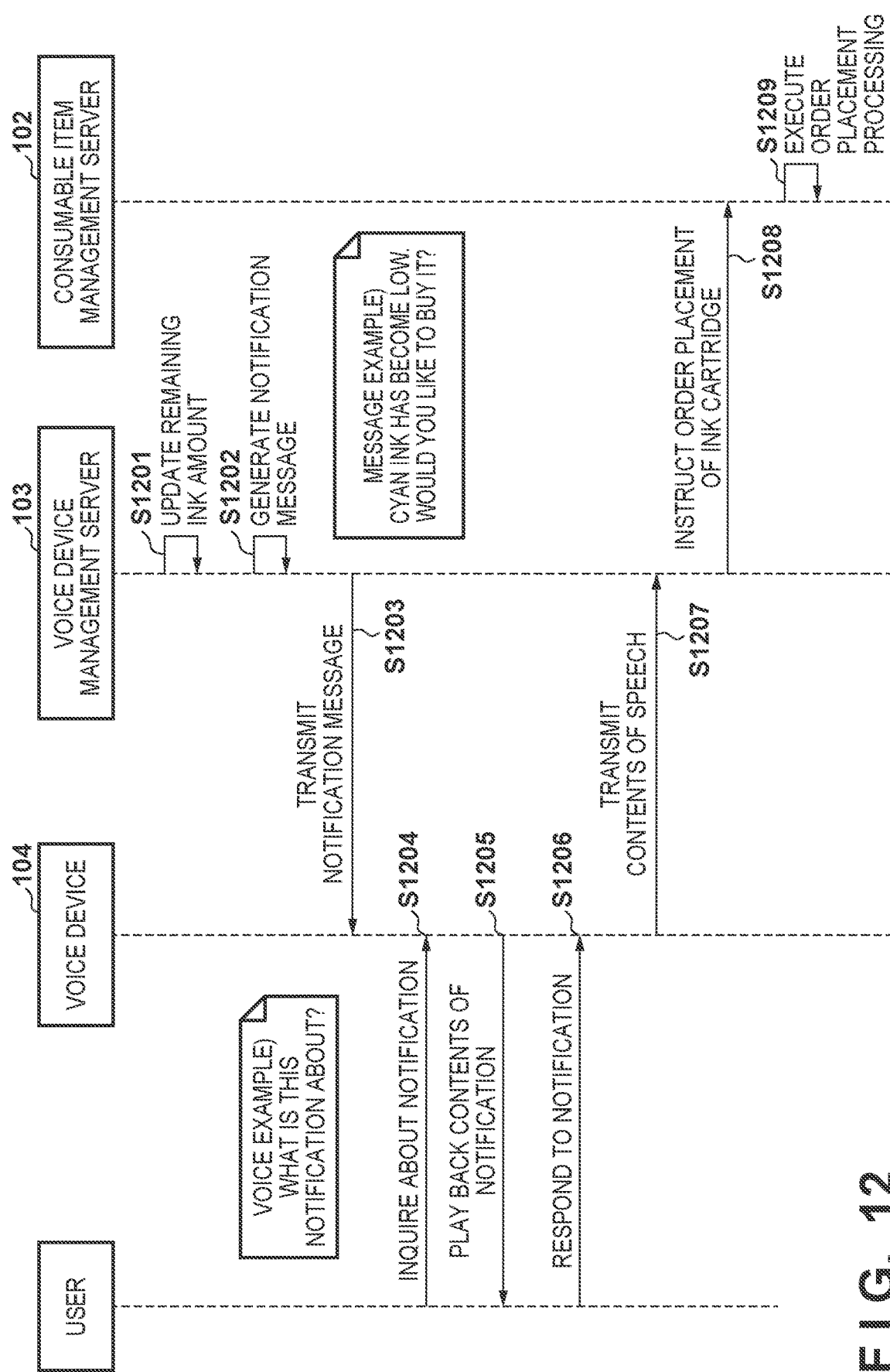
FIG. 12 is a sequence chart showing the sequence until an order instruction is issued to the consumable item management server.

FIG. 12 is a sequence chart showing a sequence from when the voice device management server 103 notifies the user of the reduction in the remaining ink amount via the voice device until the voice device management server 103 instructs the consumable item management server 102 to place an order. First, the voice device management server 103 receives the serial ID, the ink color, the order ID, and the remaining ink amount information from the consumable item management server 102. Then, the voice device management server 103 stores these received pieces of information as the remaining ink amount information of the ink cartridges of the corresponding ink colors in the printing apparatus 106 having the corresponding serial ID (S1201). Note that in a case in which the remaining ink amount information is already stored, the remaining ink amount information is updated by the remaining ink amount information newly received in S1201. The remaining ink amount information stored in S1201 can be used as display data indicating the values of the remaining ink amounts of the printing apparatus 106 and confirmable by the user on the terminal apparatus 101, and can be transmitted to the terminal apparatus 101.

In a case in which the remaining ink amount information received from the consumable item management server 102 includes a notification flag representing that user notification will be performed, the voice device management server 103 will generate message data to be used in the notification of the user via the voice device 104 (S1202). Subsequently, the voice device management server 103 transmits the generated message data to the voice device 104 (S1203). For example, message data to be used in notifying the user of a message with a content such as "The remaining ink amount of . . . has become low. Would you like to buy it?" A notification word such as "cyan" or the like can be inserted in the portion of " . . . " based on the ink color information received from the consumable item management server 102.

The voice device 104 holds the message data transmitted from the voice device management server 103. Subsequently, the user can inquire the voice device 104 about the contents of the notification by asking "What is this notification about?" (S1204). Upon receiving the inquiry, the voice device 104 will play back the message by outputting vocal sounds based on the held message data from the loudspeaker 301 (S1205).

Upon listening to the message, the user will make a voice instruction by saying, for example, "Buy cyan" in response to the message played back in S1205 (S1206). The voice device 104 transmits, to the voice device management server 103, the voice data indicating the contents of the speech of the user who made the voice input via the microphone 304 (S1207).

The voice device management server 103 performs ASR (Automatic Speech Recognition) processing to convert the voice data indicating the contents of the speech of the user into text. Then, based on the text data, the voice device management server 103 determines the operation to be performed by performing NLU (Natural Language Understanding) processing. For example, if the text data is text data instructing the purchase of cyan ink, the order placement instruction processing for cyan ink will be determined as the operation to be performed. Subsequently, the voice device management server 103 will transmit, together with the order ID, an order placement instruction for, for example, a cyan ink tank to the consumable item management server 102 (S1208).

Based on the order ID transmitted in S1208, the consumable item management server 102 will specify the product code of the corresponding ink from the consumable item information 600 of FIG. 6, and execute the order placement processing (S1209). Note that the order placement processing may be executed in the consumable item management server 102 or may be executed by placing an order to an external sales website.

This embodiment described a procedure in which an inquiry to the user is performed via the voice device 104 when the remaining ink amount has become below a threshold, and an order for the ink cartridge of the corresponding color is placed when the user has instructed the placement of the order. Here, it may also be arranged so that the user will have set, in advance, an automatic order placement setting in the terminal apparatus 101. If the automatic order placement setting has been enabled, the processes of S1202 to S1207 are skipped in the sequence of FIG. 12. In such a case, the voice device management server 103 may generate message data expressing, for example, "The ink cartridge for cyan ink has been ordered" and transmit the generated message data to the voice device 104. Such an arrangement will allow the user to recognize that an order has been automatically placed.

As described above, in this embodiment, the printing apparatus management server 105 can manage the target printing apparatus 106 in the voice device management server 103 by causing the voice device management server 103 to register the target printing apparatus 106. Subsequently, when the remaining ink amount has decreased, an inquiry to the user of the terminal apparatus 101 can be performed via the voice device 104, and an order for a new ink cartridge can be placed by the consumable item management server 102 automatically or based on user instruction.

[Processing for Deleting Information of Printing Apparatus]

Processing for deleting the information of a printing apparatus will be described next. In a case in which a plurality of printing apparatuses are managed under a single login user in the printing apparatus management server 105, the login user may make an operation to delete an arbitrary printing apparatus among this plurality of printing apparatuses. In such a case, the arbitrary printing apparatus will fall outside the management of the printing apparatus management server 105. The procedure for also deleting the information of the printing apparatus 106 from the voice device management server 103 when the login user has deleted the printing apparatus 106 from the printing apparatus management server 105 will be described hereinafter with reference to FIG. 13.

Figure 13:
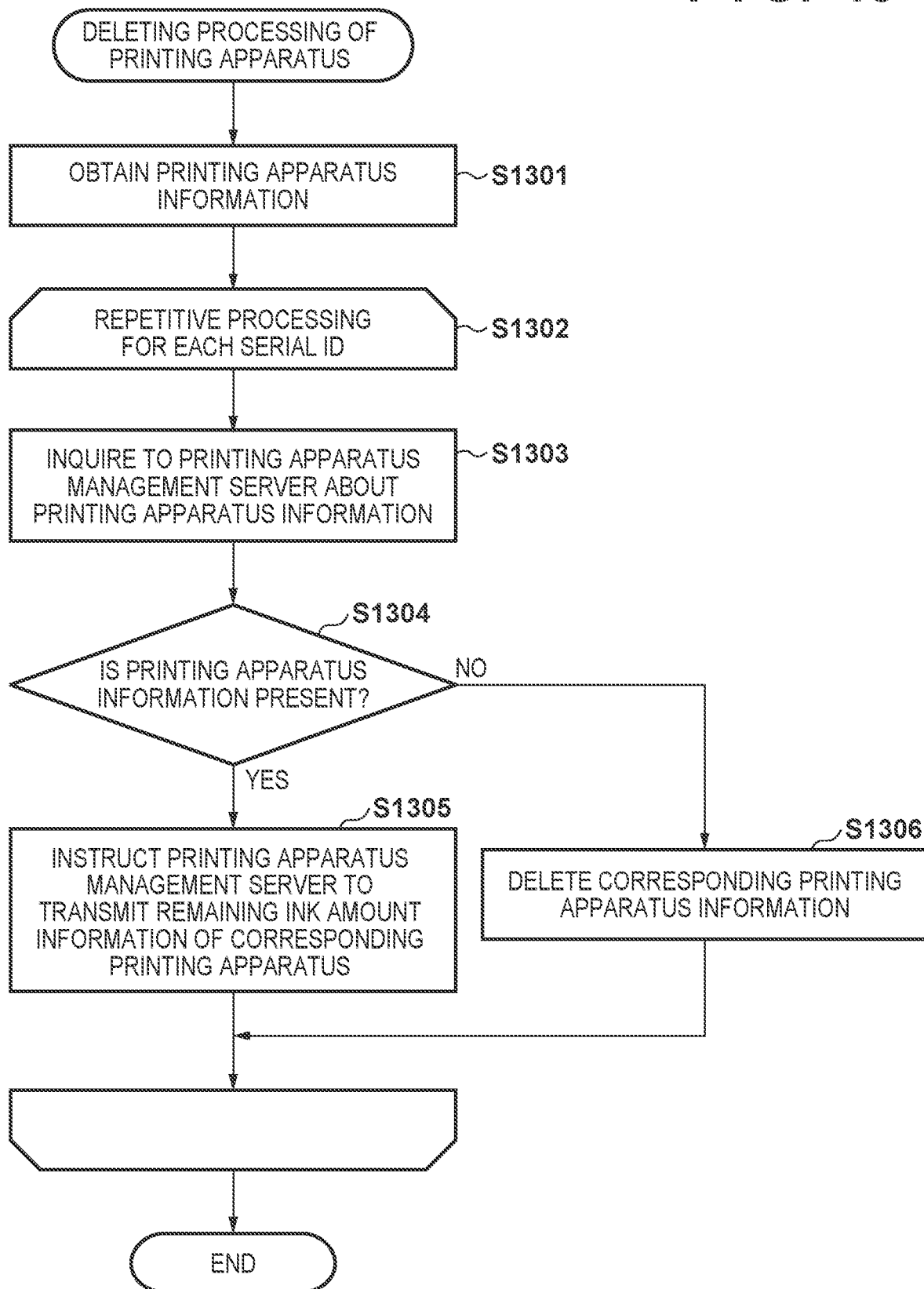
FIG. 13 is a flowchart showing processing for deleting information of the printing apparatus.

FIG. 13 is a flowchart showing processing for deleting the information of the printing apparatus 106, which has been deleted from the printing apparatus management server 105, from the voice device management server 103. The processing of FIG. 13 will be implemented by, for example, causing the CPU 501 of the voice device management server 103 to execute a program.

The CPU 501 obtains the information, for example, the serial IDs of all of the printing apparatuses 106 registered in the database 513 (step S1301). The subsequent processes are performed for each obtained serial ID (step S1302). That is, the processes from step S1302 to step S1306 are repetitively executed for the number of serial IDs that have been obtained.

Based on the obtained serial ID of the printing apparatus 106, the CPU 501 will use the first authentication information to inquire the printing apparatus management server 105 about the information of the registered printing apparatus 106 (step S1303). Upon receiving the inquiry, the printing apparatus management server 105 confirms whether the printing apparatus 106 corresponding to the serial ID is present as a registered printing apparatus in the printing apparatus management server 105, and transmits the result to the voice device management server 103.

Based on the result transmitted from the printing apparatus management server 105, the voice device management server 103 will determine whether the printing apparatus 106 corresponding to the serial ID is present as a registered printing apparatus in the printing apparatus management server 105 (step S1304). If it is determined that the printing apparatus 106 corresponding to the serial ID is present as a registered printing apparatus, the voice device management server 103 will instruct the printing apparatus management server 105 to transmit the remaining ink amount information of the printing apparatus 106 corresponding to the serial ID to the consumable item management server 102 (step S1305). Upon receiving this instruction, the printing apparatus management server 105 will make a remaining ink amount inquiry to the printing apparatus 106, and execute the processing of FIG. 10. Here, it may also be arranged so that the remaining ink amount information received in the past in step S1001 and stored in the printing apparatus management server 105 will be transmitted to the consumable item management server 102 without making the remaining ink amount inquiry to the printing apparatus 106. On the other hand, if it is determined in step S1304 that the printing apparatus corresponding to the serial ID is not present as a registered printing apparatus, the voice device management server 103 will delete, from the database 513, the information of the printing apparatus 106 corresponding to the serial ID (step S1306).

The processes described above are repetitively executed for the number of obtained serial IDs. When the processes have been performed for all of the serial IDs, the processing of FIG. 13 ends. It may be arranged so that the processing of FIG. 13 will be executed at a predetermined frequency, for example, at a predetermined time of day. Such an arrangement will allow the information of each printing apparatus 106 registered in the voice device management server 103 and the information of each printing apparatus 106 registered in the printing apparatus management server 105 to be synchronized at an appropriate timing.

Other Embodiments

The processing of FIG. 10 described that the remaining ink amount information of all of the ink colors corresponding to the serial ID will be transmitted to the consumable item management server 102 when the printing apparatus management server 105 has received the remaining ink amount information from the printing apparatus 106. However, it may be arranged so that the remaining ink amount information will be transmitted by another arrangement.

For example, the threshold 604 of the consumable item information of FIG. 6 may be included in the consumable item information 700 of FIG. 7 held by the printing apparatus management server 105. After the process of step S1003 in FIG. 10, determination as to whether the remaining ink amount corresponding to each order ID has become below the threshold 604 may be performed. That is, the printing apparatus management server 105 itself may perform the remaining ink amount threshold determination. Subsequently, only each piece of remaining ink amount information determined to have become below the item 604 may be transmitted to the consumable item management server 102 in step S1004. Such an arrangement will allow the frequency of transmission to the consumable item management server 102 to be reduced, thus allowing the communication traffic on the network to be suppressed.

In addition, after the process of step S1003 of FIG. 10, the amount of decrease may be determined from a result of comparison between the remaining ink amount corresponding to each order ID and the remaining ink amount received in the preceding step S1001. As a result of the determination, only the remaining ink amount that has been determined to have decreased by a predetermined amount will be transmitted to the consumable item management server 102 in step S1004. Such an arrangement will allow the frequency of transmission to the consumable item management server 102 to be reduced, thus allowing the communication traffic on the network to be suppressed.

Also, in a case in which it is arranged so as to reduce the frequency of transmission to the consumable item management server 102 in the manner described above, it may be arranged so that only the process of step S1105 will be performed without performing the processes of steps S1103, S1104, and S1106 in the processing performed after the process of step S1102 of FIG. 11 in the consumable item management server 102. In addition, it may be arranged so that the printing apparatus management server 105 can select to determine a transmission mode between a mode in which the remaining ink amount information of all of the ink colors will be transmitted from the printing apparatus management server 105 and a mode for reducing the frequency of transmission in the manner described above. In such a case, it will be arranged so that the printing apparatus management server 105 will transmit information about which transmission mode has been selected to the consumable item management server 102. The consumable item management server 102 will control the execution of the processes of steps S1103, S1104, and S1106 of FIG. 11 in accordance with the selected transmission mode.

Furthermore, the remaining ink amount information to be transmitted from the printing apparatus management server 105 to the consumable item management server 102 may be a statistical value (for example, an average value) of pieces of remaining ink amount information obtained a plurality of times from the printing apparatus 106 in step S1001 of FIG. 10. Such an arrangement will allow the determination accuracy to be improved when the remaining ink amount is to be compared to a threshold.

As described above, according to this embodiment, it is possible to implement a consumable item management system that allows voice notification based on the consumable item information of a printing apparatus managed by the printing apparatus management server 105 and order placement of a consumable item in correspondence with the remaining amount of the consumable item.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-153176, filed Sep. 11, 2020, which is hereby incorporated by reference herein in its entirety.

What is claimed is:

1. A system that includes a printing apparatus and at least one server which can communicate with a voice device management server which manages a voice device, the at least one server comprising:
at least one memory and at least one processor and/or at least one circuit which function as:
an obtainment unit configured to obtain information relating to a remaining amount of a consumable item used in the printing apparatus; and
a controlling unit configured to, in case where a predetermined condition corresponding to a remaining amount of the consumable item becoming low is satisfied based on the information relating to the remaining amount of a consumable item, perform control for causing a specific notification corresponding to the remaining amount of the consumable item becoming low to be notified from the voice device.

2. The system according to claim 1, wherein the controlling unit, in a case where the predetermined condition is not satisfied, does not perform the control for causing the specific notification corresponding to the remaining amount of the consumable item becoming low to be notified from the voice device.

3. The system according to claim 1, wherein the control for causing the specific notification corresponding to the remaining amount of the consumable item becoming low to be notified from the voice device is a control to transmit specific information to the voice device management server.

4. The system according to claim 3, wherein the specific information is information indicating that notification to a user via the voice device should be performed.

5. The system according to claim 3, wherein message data indicating a message for the specific notification is transmitted from the voice device management server to the voice device, based on the voice device management server receiving the specific information.

6. The system according to claim 5, wherein the message indicated by the message data is output by voice as the specific notification, in response to an inquiry by voice to the voice device from a user after the voice device receives the message data.

7. The system according to claim 6, wherein processing for placing an order for the consumable item is performed based on a voice instruction from a user being accepted by the voice device in response to the message indicated by the message data being output by voice as the specific notification.

8. The system according to claim 1, wherein processing by the obtainment unit and processing by the controlling unit are started at, at least one of a timing at which the printing apparatus has executed print processing and a predetermined time.

9. The system according to claim 1, wherein the predetermined condition includes a condition that the remaining amount of the consumable item becomes lower than a threshold.

10. The system according to claim 1, wherein account information of a voice control service provided by the voice device management server and information of the printing apparatus are associated in advance.

11. The system according to claim 1, wherein the consumable item is at least one of ink and paper.

12. A method of controlling a printing apparatus and at least one server which can communicate with a voice device management server which manages a voice device, the method comprising:
obtaining information relating to a remaining amount of a consumable item used in the printing apparatus; and
in case where a predetermined condition corresponding to a remaining amount of the consumable item becoming low is satisfied based on the information relating to remaining amount of a consumable item, causing a specific notification corresponding to the remaining amount of the consumable item becoming low to be notified from the voice device.

13. The method according to claim 12, wherein, in a case where the predetermined condition is not satisfied, the specific notification corresponding to the remaining amount of the consumable item becoming low to be notified from the voice device is not performed.

14. The method according to claim 12, wherein the specific notification corresponding to the remaining amount of the consumable item becoming low to be notified from the voice device is a transmission of specific information to the voice device management server.

15. The method according to claim 14, wherein the specific information is information indicating that notification to a user via the voice device should be performed.

16. The method according to claim 14, wherein message data indicating a message for the specific notification is transmitted from the voice device management server to the voice device, based on the voice device management server receiving the specific information.

17. The method according to claim 16, wherein the message indicated by the message data is output by voice as the specific notification, in response to an inquiry by voice to the voice device from a user after the voice device receives the message data.

18. The method according to claim 17, wherein processing for placing an order for the consumable item is performed based on a voice instruction from a user being accepted by the voice device in response to the message indicated by the message data being output by voice as the specific notification.

19. The method according to claim 12, wherein processing is started at, at least one of a timing at which the printing apparatus has executed print processing and a predetermined time.

20. The method according to claim 12, wherein the predetermined condition includes a condition that the remaining amount of the consumable item becomes lower than a threshold.

21. The method according to claim 12, wherein account information of a voice control service provided by the voice device management server and information of the printing apparatus are associated in advance.

22. The method according to claim 12, wherein the consumable item is at least one of ink and paper.

23. A non-transitory computer-readable storage medium for controlling a printing apparatus and at least one server which can communicate with a voice device management server which manages a voice device, to obtain information relating to remaining amount of a consumable item used in the printing apparatus; and in case where a predetermined condition corresponding to a remaining amount of the consumable item becoming low is satisfied based on the information relating to remaining amount of a consumable item, perform control for causing a specific notification corresponding to the remaining amount of the consumable item becoming low to be notified from the voice device.

* * * * *